United States Patent
Prodan et al.

(10) Patent No.: US 12,029,374 B2
(45) Date of Patent: Jul. 9, 2024

(54) LINT ROLLER ASSEMBLY

(71) Applicants: Walter Prodan, West Hills, CA (US); Linda Jackson Prodan, West Hills, CA (US)

(72) Inventors: Walter Prodan, West Hills, CA (US); Linda Jackson Prodan, West Hills, CA (US)

( * ) Notice: Subject to any disclaimer, the term of this patent is extended or adjusted under 35 U.S.C. 154(b) by 509 days.

(21) Appl. No.: 17/389,233

(22) Filed: Jul. 29, 2021

(65) Prior Publication Data

US 2023/0029631 A1  Feb. 2, 2023

(51) Int. Cl.
*A47L 25/00* (2006.01)
*F16C 19/04* (2006.01)

(52) U.S. Cl.
CPC ............ *A47L 25/005* (2013.01); *F16C 19/04* (2013.01); *F16C 2314/00* (2013.01)

(58) Field of Classification Search
CPC ... A47L 25/005; B65H 35/0026; F16C 19/04; F16C 2314/00
USPC .................................... 15/104.002
See application file for complete search history.

(56) References Cited

U.S. PATENT DOCUMENTS

| | | | | |
|---|---|---|---|---|
| 2,592,969 | A * | 4/1952 | Stachowiak | A47L 25/005 |
| | | | | 206/813 |
| 5,451,197 | A * | 9/1995 | Grant | F16C 13/006 |
| | | | | 492/45 |
| 7,047,587 | B2 | 5/2006 | Heidel | |
| 7,600,286 | B2 | 10/2009 | Schmidt | |
| 7,665,175 | B2 | 2/2010 | Jewell | |
| 10,219,676 | B2 | 3/2019 | Woolman | |
| 10,349,813 | B2 | 7/2019 | Savignac | |
| 2005/0184099 | A1 * | 8/2005 | McKay | A47L 25/005 |
| | | | | 15/104.002 |
| 2007/0204416 | A1 | 9/2007 | Treacy | |
| 2016/0000298 | A1 * | 1/2016 | Trunsky | A47L 25/005 |
| | | | | 15/104.002 |
| 2017/0325656 | A1 | 11/2017 | Steele | |

FOREIGN PATENT DOCUMENTS

| | | | | |
|---|---|---|---|---|
| CA | 2507151 | A1 * | 11/2006 | ........... A47L 25/005 |
| KR | 20-2009-0000930 | | * 2/2009 | ............. A47L 25/08 |
| WO | 2019122823 | | 6/2019 | |

OTHER PUBLICATIONS

Computer generated English translation of KR 20-2009-0000930, 김승곤, Feb. 2, 2009. (Year: 2009).*

* cited by examiner

*Primary Examiner* — Laura C Guidotti
(74) *Attorney, Agent, or Firm* — Gregson IP Law, LLC

(57) ABSTRACT

An article of manufacture for providing a lint roller assembly is disclosed. The lint roller assembly includes a handle having an opening to couple to a shaft component, a roller barrel having a shaft opening running lengthwise through the center of the roller barrel and a pair of bearing cavities at each end, the shaft component having a threaded end and an opposite end having a threaded retaining hole, and a pair of bearing components having an outer edge and an inner edge. The roller barrel being configured to retain a roll of adhesive material about the outer surface. The outer edge being coupled to the bearing cavities and the inner edge engaging the shaft component to permit the roller barrel to rotate about the shaft component.

3 Claims, 5 Drawing Sheets

LINT ROLLER ASSEMBLY

TECHNICAL FIELD

This application relates in general to an article of manufacture for providing garment cleaning aids, and more specifically, to an article of manufacture providing a lint roller assembly.

BACKGROUND

People who work with grooming hairy animals, among other people, encounter a significant amount of loose hair that must be cleaned up from their person as well as any workspace. Existing methods to clean up this material may include use of a link brush to remote the unwanted items from clothing and other personal locations. Existing lint brushes, however, frequently break as they are made from plastic and other lightweight materials. Additionally, these link brushes typically bind, drag, and cease to continue to roll once they have become clogged with hair being removed. These existing lint brushes easily fall from an upright position that is needed to keep the adhesive used to collect items from coming in contact with items on tabletops and shelves.

Therefore, a need exists for an article of manufacture for providing a lint roller assembly. The present invention attempts to address the limitations and deficiencies in prior solutions according to the principles and example embodiments disclosed herein.

SUMMARY

In accordance with the present invention, the above and other problems are solved by providing an article of manufacture providing a lint roller assembly according to the principles and example embodiments disclosed herein.

In one embodiment, the present invention is an article of manufacture for providing a lint roller assembly. The lint roller assembly includes a handle having an opening to couple to a shaft component, a roller barrel having a shaft opening running lengthwise through the center of the roller barrel and a pair of bearing cavities at each end, the shaft component having a threaded end and an opposite end having a threaded retaining hole, and a pair of bearing components having an outer edge and an inner edge. The roller barrel being configured to retain a roll of adhesive material about the outer surface. The outer edge being coupled to the bearing cavities and the inner edge engaging the shaft component to permit the roller barrel to rotate about the shaft component.

In another aspect of the present invention, the lint roller assembly further includes a cover, a retaining screw, and a pair of retaining clips, each having a C-shape for attaching to the shaft component adjacent to each of the bearing components.

In another aspect of the present invention, the cover engages one of pair of bearing components positioned at an open end of the roller barrel opposite the handle, the cover having a hole to permit the retaining screw to engage the threaded retaining hole of the shaft component.

In another aspect of the present invention, the pair of retaining clips each attach to engaging slots in the shaft component to restrain the components from moving relative to each other.

In another aspect of the present invention, the handle, the roller barrel, and the shaft components are made of aluminum.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
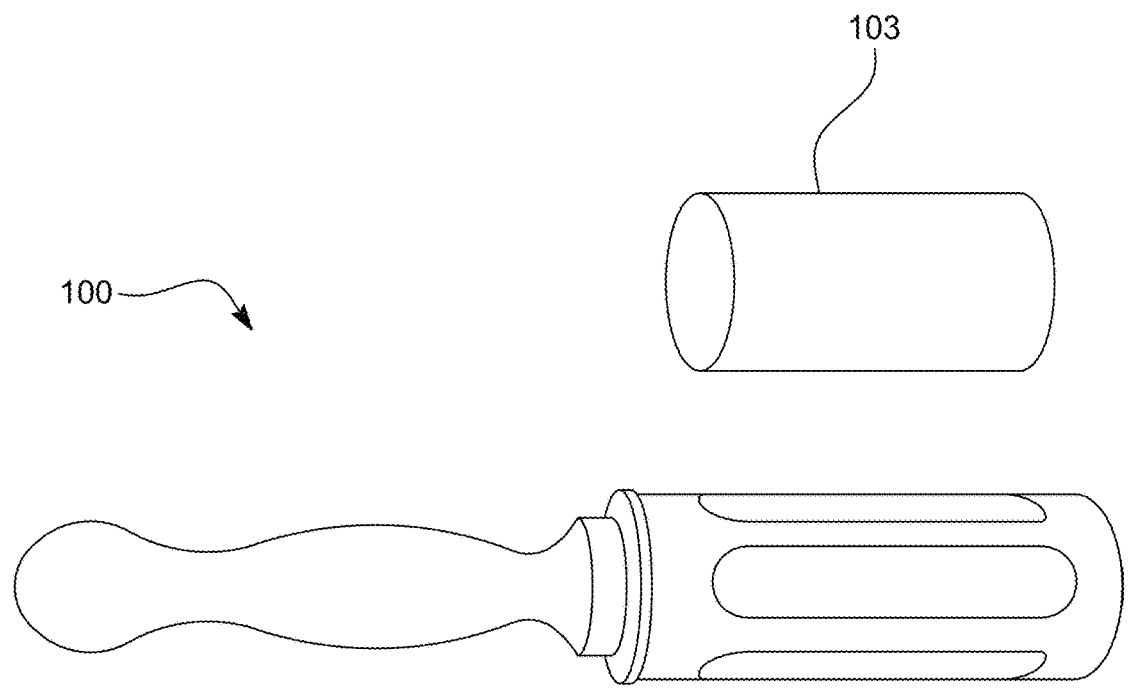
FIG. 1 illustrates an example embodiment of an article of manufacture providing a lint roller assembly according to the present invention.

This application relates in general a system and method for providing garment cleaning aids, and more specifically, to an article of manufacture for a lint roller assembly according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual," and "user" refer to an entity, e.g., a human, using a lint roller assembly associated with the invention. The term user herein refers to one or more users.

The term "invention" or "present invention" refers to the invention being applied for via the patent application with the title "Lint Roller Assembly." Invention may be used interchangeably with roller. In general, the present disclosure relates a system and method for providing a lint roller assembly. To better understand the present invention, FIG. 1 illustrates an example embodiment of an article of manufacture providing a lint roller assembly according to the present invention. A lint roller brush 100 is shown in FIG. 1 having a handle portion 102 and a roller barrel assembly 101 coupled together to form the link roller brush 100.

A roll of adhesive material 103 is placed onto the roller portion 101 by sliding the roll of adhesive material 103 onto an open end of roller barrel assembly 101. The adhesive material 103 covers the entire exposed surface of the roll of adhesive material 103 and may be used to collect link and debris off of garments while they are being worn, hanging up on a hanger, and laying across a flat surface such as a bed or ironing board. The roll of adhesive material 103 may be replaced as needed.

Typically, a portion of the adhesive material 103 may be removed that covers the exposed surface of the roll that exposes another layer of adhesive material 103. Portions of the roll of adhesive material 103 are removed once they have been used and have collected lint and debris. A new roll of adhesive material 103 is used once all of the adhesive material 103 of an existing roll has been consumed.

Figure 2:
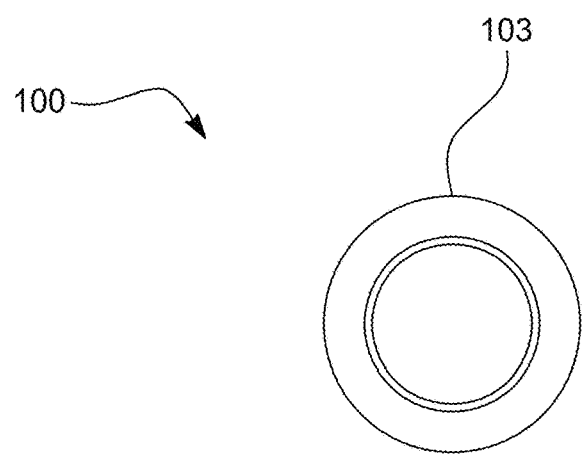
FIG. 2 illustrates a top view of an article of manufacture providing a lint roller assembly according to the present invention.

FIG. 2 illustrates a top view of an article of manufacture providing a lint roller assembly according to the present invention. FIG. 2 shows a top down view of the link roller brush 100. A roll of adhesive material 103 is shown placed onto the roller barrel assembly 101 of the link roller brush 100 in FIG. 2.

Figure 3:
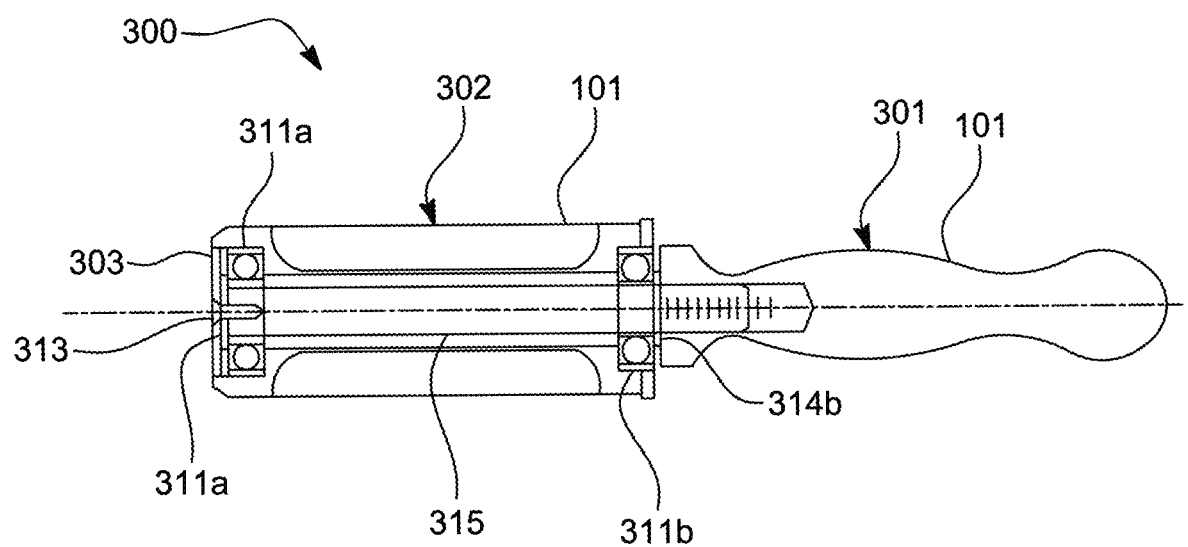
FIG. 3 illustrates a top view of an article of manufacture providing a lint roller assembly according to the present invention.

FIG. 3 illustrates a schematic of an article of manufacture for a lint roller assembly according to the present invention. The roller barrel assembly 101 of the link roller brush 100 comprises a roller barrel 302 position around a shaft 315 running the entire length of the roller barrel 302. A pair of bearings 311a-b are located at each end of the roller barrel 302 between the shaft 315 and the roller barrel 302. The pair of bearings 311a-b permits the roller barrel 302 to rotate freely about the shaft 315.

A pair of handle retainer clips 314a-b are placed outside of the roller barrel 302 about the shaft 315 to securely hold the bearings 311a-b in place. An outer barrel retainer clip 314a is located along an open end of the roller barrel 302 and includes a cover 303 to hide the components from the external environment. A handle retainer clip 314b is located along a handle end of the roller barrel 302 adjacent to the handle 301. The shaft 315 extends outward from the roller barrel 302 and is secured within the handle 301. The shaft 315 is threaded in a preferred embodiment to engage mating threads within an opening in the handle 301 to hold the shaft and roller barrel 302 attached to the handle 301.

The shaft 315, in a preferred embodiment, has ⅜-16 external thread and the handle 301 has ⅜-16 internal thread that uses a sealant, for example, Locktite sealant, to seal the shaft 315 in place within the handle 301 ensuring that they do not come apart during use. The roller barrel 302 sits onto the shaft 315 and held to in place by retainer clips 314a-b. The cover 303 is used to shield the top roller bearing 311a which is a moving part from derbies, hands or any other object that can be lodged within the bearing. The cover 303 is held by a 4-40 retaining screw 313 with Locktite sealant. The handle 301 the cover 303, and the roller barrel 302 are made from aircraft grade aluminum 6061 in a preferred embodiment. The shaft 315 is made of aircraft grade 303 CRES. All of the aluminum components are anodized MIL-A-8625 Type II color optional. The retainer clips 314a-b, roller bearings 311a-b, and 4-40 retaining screw 313 are purchased hardware from industrial hardware suppliers.

When an individual is holding the handle portion 102 of the link roller brush 100, the roller barrel assembly 101 is free to rotate as the pair of bearings 311a-b are free to rotate about the shaft 315. The rotation of the roller barrel assembly 101 of the link roller brush 100 allows the adhesive material 103 to pass over a garment to collect the link and debris.

Each of the components of FIG. 3 are illustrated in FIGS. 4-10 below. These components are assembled as shown in FIG. 3 to create the lint roller brush 100. Other embodiments of these components may be used to perform the same functions as these components are shown for exemplarily purposes. The present invention is to be limited only by the claims attached hereto and not any particular component disclosed herein.

Figure 4:
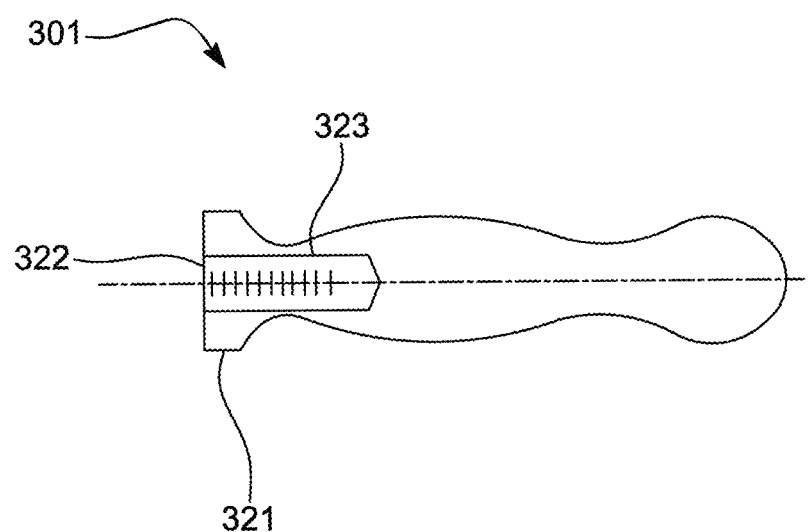
FIG. 4 illustrates a side view of a handle used as part of an article of manufacture providing a lint roller assembly according to the present invention.

FIG. 4 illustrates a side view of a handle used as part of an article of manufacture providing a lint roller assembly according to the present invention. The handle 301 has the outer handle portion 102 that is grasped by a user with using the lint roller brush 100. At a roller end 321 has an opening 322 having mating threads 323 for engaging mating threads on the shaft 315. The handle 301 is shown with an outside shape to provide a comfortable grip to the user. The roller end 321 of the handle 301 is made wide enough to support the attachment of the roller barrel assembly 101 to the handle 301 when used.

Figure 5:
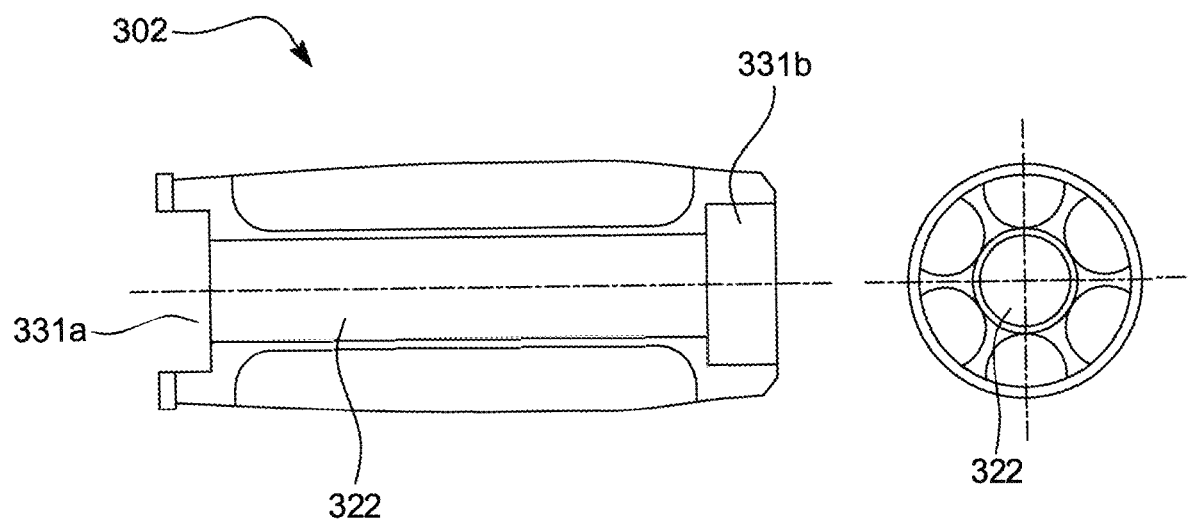
FIG. 5 illustrates a side view of a roller barrel used as part of an article of manufacture providing a lint roller assembly according to the present invention.

FIG. 5 illustrates a side view of a roller barrel used as part of an article of manufacture providing a lint roller assembly according to the present invention. The roller barrel 302 provides a rotatable solid component to retain the roll of adhesive material 103 that is used to collect hair and debris. The outer diameter is configured to match an inner diameter of the roll of adhesive material 103. Each end of the roller barrel 302 has a bearing cavity 331a-b that coupled to an outside edge 352 of a pair of bearing components 311a-b while a center edge 353 of the bearing component 311a-b engages the shaft 315. This configuration allows the roller barrel 302 to rotate freely about the shaft 315 as the bearing components 311a-b are permitted to rotate.

A shaft opening 332 runs the length of the roller barrel 302 and is centered to place the shaft opening 332 in a center axis of the roller barrel 302. The shaft opening 332 is sized to permit the shaft component 315 to pass completely through the roller barrel 302 to allow a threaded end 341 of the shaft component 315 to engage the opening 322 within the handle 301.

Figure 6:
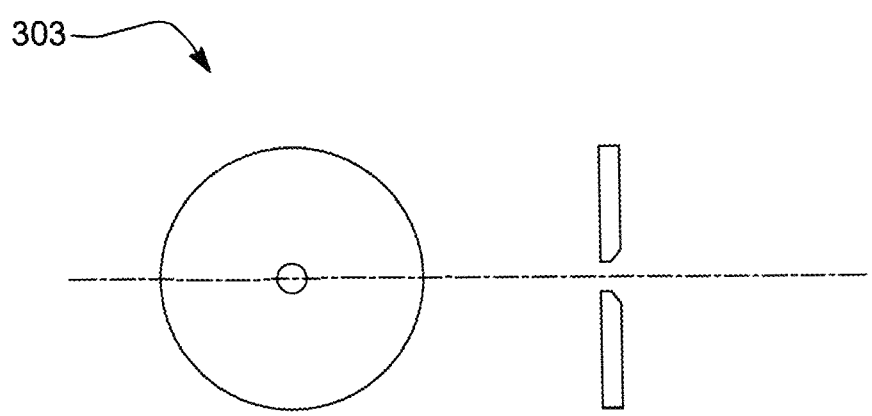
FIG. 6 illustrates side and end views of a cover used as part of an article of manufacture providing a lint roller assembly according to the present invention.

FIG. 6 illustrates side and end views of a cover used as part of an article of manufacture providing a lint roller assembly according to the present invention. The cover 303 is used to enclose the open end of the roller barrel assembly 101 as a retaining screw 313 is inserted to hold the cover and the bearing component 311a to the shaft component 315 as the bearing component is placed within the bearing cavity 331a. The cover 303 is configured to match the retaining screw 313 and an attaching threaded hole 342 in the end of the shaft component 315.

Figure 7:
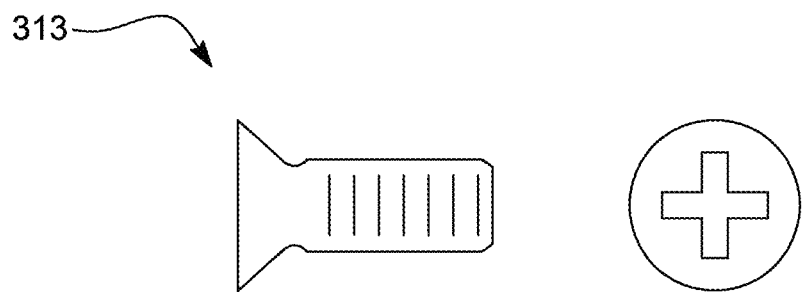
FIG. 7 illustrates side and end views of a retaining screw used as part of an article of manufacture providing a lint roller assembly according to the present invention.

FIG. 7 illustrates side and end views of a retaining screw used as part of an article of manufacture providing a lint roller assembly according to the present invention. The retaining screw 313 as show in FIG. 7 is an ordinary screw that engages the attaching threaded hole 342 on the shaft 315. The embodiment of FIG. 7 shows a Philips head screw although other screws such as slotted screws, torx head screws and the like may also be used. A pair of retaining slots 362a-b are positioned at each end of the shaft component 315 to engage a retaining clip 314a-b.

Figure 8:
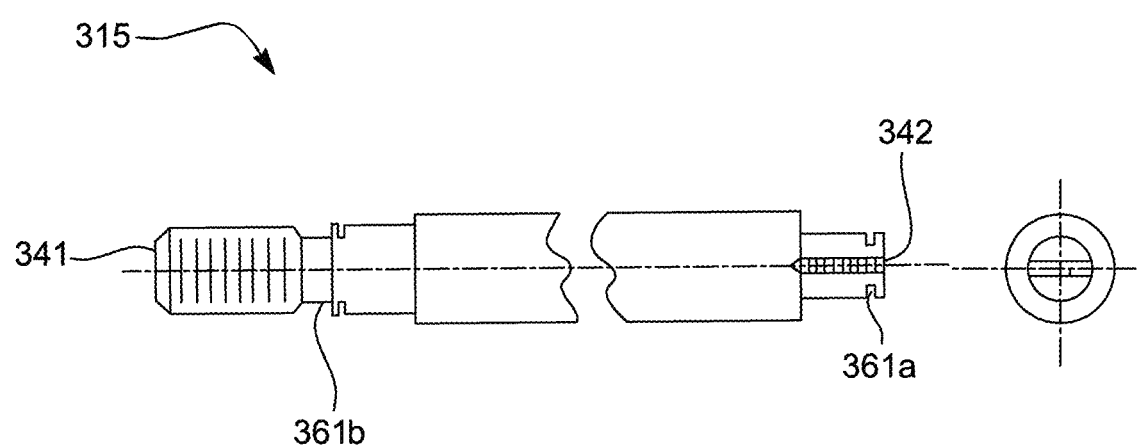
FIG. 8 illustrates a top view of a shaft component used as part of an article of manufacture providing a lint roller assembly according to the present invention.

FIG. 8 illustrates side and end views of a shaft component used as part of an article of manufacture providing a lint roller assembly according to the present invention. The shaft component 315 is placed through the shaft opening 332 of the roller barrel 302 allowing the threaded end 341 that engages the mating threads 323 in the opening 322 in the handle 301 as described above. An opposite end of the shaft component 315 contains the attaching threaded hole 342 into which the retaining screw 313 is placed to hold the roller barrel assembly 101 to the shaft component 315. The shaft component 315 is sized to pass through the shaft opening 332 to allow the shaft component 315 to be coupled to the handle 301 while the attaching threaded hole 342 is adjacent to the bearing component 311a that secures the assembly together.

Figure 9:
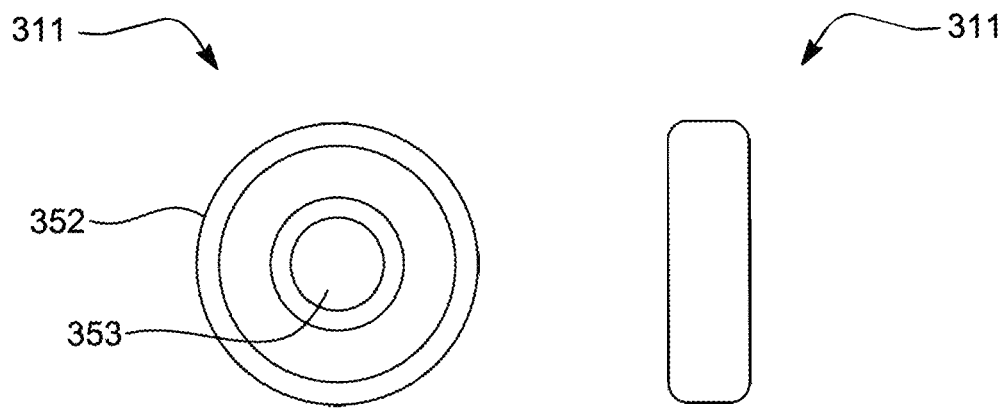
FIG. 9 illustrates a top view of a bearing component used as part of an article of manufacture providing a lint roller assembly according to the present invention.

FIG. 9 illustrates side and end views of a bearing component used as part of an article of manufacture providing a lint roller assembly according to the present invention. From the end view 351, the outside edge 352 of a pair of bearing components 311a-b is shown surrounding the center edge 353 of the bearing component 311a-b in which the two edges rotate about a central axis. As described above the center edge 353 of the bearing component 311a-b engages the shaft component 315 and the outside edge 352 of a pair of bearing components 311a-b engages the roller barrel 302.

Figure 10:
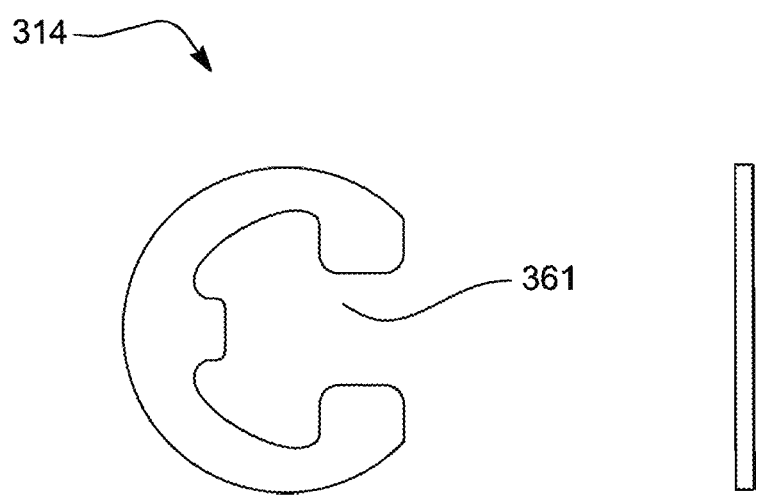
FIG. 10 illustrates a top view of a retainer clip used as part of an article of manufacture providing a lint roller assembly according to the present invention.

FIG. 10 illustrates side and end views of a retainer clip used as part of an article of manufacture providing a lint roller assembly according to the present invention. The retaining clip 314 is shown as a "C" shaped clip that attached to the shaft component 315 adjacent to a bearing component 311a-b to assist in holding the bearing components coupled to the roller barrel. The inner shape 361 of the retaining clip 313 matches an engaging slots 362a-b in the shaft component 315 to restrain the components from moving relative to each other. Identical retaining clips 314a-b are used at each end of the shaft component 315 to restrain the components when the lint roller brush 100 is assembled.

Using the above components results in a lint roller brush 100 that possesses several improvements which differentiates it from others on the market. The lint roller brush 100 is made of aircraft materials aluminum and stainless steel. In contrast, current products on the market are made of plastic and as a result, break regularly and frequently. Due to roller bearings components 311a-b the roller barrel 302 always flows smoothly and unlike those on the market it does not bind, drag, or cease to roll. As a result of the weight of the lint roller brush 100, and its smooth motion, there is significantly less operator effort and less arm fatigue to accomplish cleaning the desired surface. Users have no fear of the product breaking with force. The lint roller brush 100 is designed to stand upright. The standing function prevents the roller from falling over and making a time consuming mess and allows for easy storage in small places. The roller barrel 302 is designed to provide a slight press fit on the cardboard center of the adhesive paper which keeps the adhesive paper roll on the unit and keeps it from flying off the handle like so many of the rollers on the market. Even with aggressive/rapid rolling, the adhesive roll 103 stays in place and does not come off. Additionally, the handle 301 is comfortable and designed not to slip out of a user's hands.

Even though particular combinations of features are recited in the present application, these combinations are not intended to limit the disclosure of the invention. In fact, many of these features may be combined in ways not specifically recited in this application. In other words, any of the features mentioned in this application may be included in to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A lint roller assembly, the lint roller assembly comprises:
   a handle having an opening to couple to a shaft component;
   a roller barrel having a shaft opening running lengthwise through the center of the roller barrel and a pair of bearing cavities, wherein one of the pair of bearing cavities is at each end, the roller barrel being configured to retain a roll of adhesive material about the outer surface;
   the shaft component having a threaded end and an opposite end having a threaded retaining hole;
   a pair of bearing components each having an outer edge and an inner edge, the outer edge of each being coupled to a respective one of the bearing cavities and the inner edge of each engaging the shaft component to permit the roller barrel to rotate about the shaft component;

a cover;

a retaining screw; and a pair of retaining clips, each having a C-shape for attaching to the shaft component adjacent to each of the bearing components;

wherein the cover engages one of pair of the bearing components positioned at an open end of the roller barrel opposite the handle, the cover having a hole to permit the retaining screw to engage the threaded retaining hole of the shaft component.

2. The lint roller assembly according to claim 1, wherein the pair of retaining clips each attach to engaging slots in the shaft component to restrain the components from moving relative to each other.

3. The lint roller assembly according to claim 1, wherein the handle, the roller barrel, and the shaft components are made of aluminum.

* * * * *